United States Patent [19]

Frey et al.

[11] Patent Number: 4,728,128
[45] Date of Patent: Mar. 1, 1988

[54] CONNECTION ASSEMBLY FOR JOINING TWO PARTS

[75] Inventors: Alfred Frey, Wattenheim; Robert Burger, Monsheim, both of Fed. Rep. of Germany

[73] Assignee: Didier-Werke AG, Wiesbaden, Fed. Rep. of Germany

[21] Appl. No.: 919,214

[22] Filed: Oct. 15, 1986

[30] Foreign Application Priority Data

Dec. 7, 1985 [DE] Fed. Rep. of Germany ....... 3543311

[51] Int. Cl.⁴ ............................................. F16C 49/00
[52] U.S. Cl. ..................................... 285/157; 285/187; 285/423; 285/911
[58] Field of Search ............... 285/911, 187, 157, 925, 285/423

[56] References Cited

U.S. PATENT DOCUMENTS

| 1,604,868 | 10/1926 | Woodruff | 285/187 X |
| 2,445,273 | 7/1948 | Kennedy | 285/925 X |
| 3,877,518 | 4/1975 | Dreksler | 285/157 X |
| 4,171,832 | 10/1979 | Metcalfe | 285/911 X |
| 4,196,923 | 4/1980 | Zimmerli et al. | 285/157 X |
| 4,445,715 | 5/1984 | Inoue et al. | 285/911 X |
| 4,552,386 | 11/1985 | Burchette | 285/187 |

FOREIGN PATENT DOCUMENTS 1088199  9/1960  Fed. Rep. of Germany ...... 285/187

Primary Examiner—Thomas F. Callaghan
Attorney, Agent, or Firm—Wenderoth, Lind & Ponack

[57] ABSTRACT

A connection assembly for joining two parts having confronting ends with a joint therebetween, particularly ceramic pipes, includes a dimensionally stable coupling member surrounding the joint and at least one of the two confronting ends of the two parts to be joined. The coupling member is dimensioned to define a space with the at least one part end. This space is filled with a ceramic fiber mat material containing a swelling agent capable of volume expansion when subjected to a temperature above a given minimum temperature. As a result, upon being subjected to an operating temperature above such given temperature, the swelling agent swells the ceramic fiber mat material, such that the mat material is compressed between the coupling member and the at least one part end surrounded thereby, thereby connecting the two parts.

20 Claims, 1 Drawing Figure

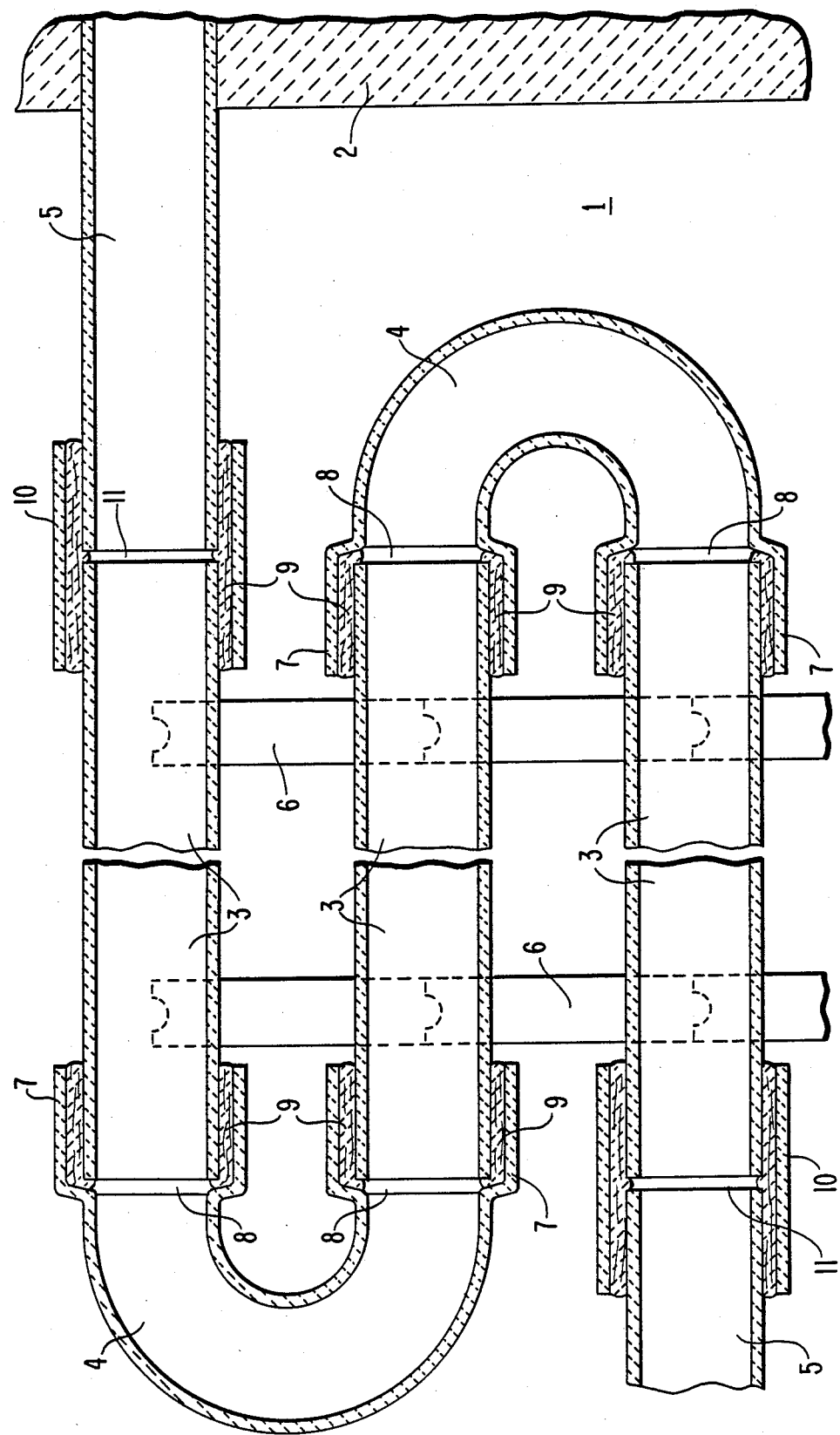

CONNECTION ASSEMBLY FOR JOINING TWO PARTS

BACKGROUND OF THE INVENTION

The present invention relates to a connection assembly for connecting two parts, particularly two ceramic parts, which are to be operated in an environment wherein the parts are subjected to a relatively high operating temperature. The present invention also relates to an assembly of the two parts joined by such a connection assembly.

It is known to connect ceramic parts by screwed or flanged connections. It also is known to connect ceramic parts by mortaring or cementing. However, such connections usually are rigid and brittle, so that at elevated operating temperatures the ceramic parts are subjected to stresses that deleteriously effect the connection between the two parts.

If the two parts are hollow, such as pipes, which are intended to convey a medium at an elevated operating temperature, a stable, fluid-tight connection is especially important.

Also known are ceramic fiber mat materials which contain up to approximately 40 to 60 weight % ceramic fibers and approximately 60 to 40 weight % of a bloating or swelling mica or vermiculite material and an organic binder. If this material is subjected to an elevated operating temperature, then beginning at about 200° C. the swelling or bloating mica or vermiculite undergoes a volume expansion, i.e. swelling, with liberation of water of crystallization. As a result of this phenomenon, a considerable increase in volume of the ceramic fiber mat material occurs. The bloating or swelling mica or vermiculite is temperature resistant and stable up to a temperature of approximately 800° C. during continuous exposure.

SUMMARY OF THE INVENTION

With the above discussion in mind, it is an object of the present invention to provide a connection assembly for joining two parts whereby it is possible to overcome the above discussed and other disadvantages of known prior art connection systems. It is a further object of the present invention to provide an assembly of two parts joined by such a connection.

It is a more specific object of the present invention to provide such an assembly with which the two parts can be connected in a manner to be free of stress and in a fluid-tight relationship without mortar and without screwed or flanged joints.

It is a still further object of the present invention to provide such an assembly whereby the joint between the two parts which are connected is elastic and is capable of withstanding elevated operating temperatures and stresses resulting therefrom.

The above objects are achieved in accordance with the present invention by the construction of a connection assembly incorporating the use of the above discussed ceramic fiber mat material containing a swelling agent capable of volume expansion when subjected to an elevated temperature. Thus, it is a fundamental feature of the present invention to employ such previously known material in a new manner, i.e. for forming a connection assembly in the manner described below.

Thus, the connection assembly of the present invention joins two parts having confronting ends with a joint therebetween and includes a dimensionally stable coupling member surrounding the joint and at least one of the two confronting ends of the two parts to be joined. The coupling means is dimensioned to define a space with the at least one part end. A ceramic fiber mat material is positioned within the space, and such material contains a swelling agent capable of volume expansion when subjected to a temperature above a given minimum temperature, thereby forming means for, upon being subjected to an operating temperature above such given temperature, swelling the mat material, such that the mat material is compressed between the coupling member and the at least one part end surrounded by the coupling member, thereby connecting the two parts.

Thus, when the two parts are subjected to the elevated operating temperature, ranging for example from 200° C. to 800° C., the swelling agent in the ceramic fiber mat material will swell or bloat. The fiber mat material substantially is retained within the space between the at least one part end and the surrounding coupling member and substantially cannot escape therefrom. As a result, the fiber mat material will be compressed and will develop a pressure which holds the two parts together by frictional contact. The fiber mat material thus compressed between the coupling member and the at least one part forms an elastic clamping seat between the parts so that the connection is not loaded by mechanical stresses. The coupling member is stable at the elevated operating temperature and also withstands temperature stresses. The compressed fiber mat material is stable at the elevated operating temperature. The connection can be made easily since the connection assembly essentially is a plug-in type connection.

If the two parts to be joined are hollow parts, such as pipes, which convey a medium, then the compressed fiber mat material additionally functions as a fluid-tight seal to prevent escape of the medium.

The coupling member can be formed as a component separate from the two parts to be joined, with the coupling member surrounding both of the confronting part ends, particularly when the parts are lengths of pipe. Additionally however, the coupling member may be formed on one of the part ends, for example as an integral extension thereof to surround the other part end.

The connection of the present invention particularly is contemplated as being employed to connect ceramic pipes in recuperators. In such case, the pipe unions are located within the flue gas stream within the interior of the recuperator casing. As a result, additional ducts and baffle chambers installed at the outside of the recuperator are unnecessary.

It also is contemplated that the connection assembly of the present invention may be employed to connect a burner nozzle to a nozzle block, or to seal off measuring sockets.

BRIEF DESCRIPTION OF THE DRAWING

Other objects, features and advantages of the present invention will be apparent from the following detailed description, taken with the accompanying drawing, wherein:

The single FIGURE is a partial view of a plurality of ceramic pipes located within a recuperator and joined by connection assemblies according to the present invention.

DETAILED DESCRIPTION OF THE INVENTION

A recuperator casing 2 includes an interior 1 through which is passed a flue gas. Located within interior 1 are parallel lengths of rectilinear, cylindrical pipes 3 of a ceramic material of known composition. The ends of pipes 3 are connected to form a serpentine assembly by pipe bends 4, also of a ceramic material of conventional composition. The top and bottom pipes 3 are connected respectively to inlet and outlet pipes 5 of a ceramic material of conventional composition. Pipes 3 are spaced in parallel orientation at a desired distance by means of spacers 6, for example of conventional construction.

The connections between pipes 3, 4, 5 are formed by connection assemblies according to the present invention.

Thus, respective ends of each pipe bend 4 are connected to ends of pipe lengths 3 by connection assemblies, each of which includes a coupling member 7 which is an integral, increased diameter extension of pipe bend 4 and which surrounds a joint 8 between ends of pipes 3, 4 and the connected end of pipe 3. Coupling member 7 is dimensioned to define with the end of pipe 3 a space. Joint 8 is much narrower than the length of coupling member 7. The inside diameter of coupling member 7 is larger than the outside diameter of pipe 3 by at least twice the wall thickness of pipe 3 and pipe bend 4. The thus formed space has inserted therein a circumferential strip, or other form, of a ceramic fiber mat material 9 containing a swelling agent capable of volume expansion when subjected to a temperature above a minimum temperature.

Respective pipes 3 are connected to pipes 5 by connection assemblies including coupling members 10 which are formed of a ceramic material of conventional composition and which are separate from pipes 3, 5. Coupling member 10 is approximately twice as long as coupling member 7 and surrounds both confronting ends of pipes 3, 5, as well as joint 11 therebetween. The inside diameter of coupling member 10 corresponds to that of coupling member 7, and the space formed between coupling member 10 and confronting ends of pipes 3, 5 is filled with a ceramic fiber mat material 9 which has an axial length approximately twice that of the fiber mat material positioned within coupling member 7.

The ceramic fiber mat material 9 contains a swelling agent capable of volume expansion when subjected to a temperature above a minimum temperature and thereby forms means for, upon the assembly being subjected to an operating temperature above such minimum temperature, swelling or bloating the ceramic fiber mat material and compressing the mat material between the coupling member and the end or ends of the respective pipes. The composition of the ceramic fiber mat material is not itself new and is known as would be understood by one skilled in the art. Thus, the ceramic fiber mat material includes ceramic fibers of size and composition which are conventional and also includes a bloating or swelling agent such as expandable vermiculite or mica distributed between layers of the ceramic fibers, as is known, as well as a conventional binder, e.g. an organic binder based on latex, which holds the mats together until use. A known such arrangement includes approximately 40 to 60 weight % ceramic fibers and approximately 60 to 40 weight % of expandable vermiculite or mica. However, one of ordinary skill in the art would understand what specific ceramic fiber size and composition and swelling agent composition could be employed in the present invention, the result being the above discussed functions. Thus, the swelling agent must be capable of swelling the ceramic fiber mat material at a particular operating temperature by an amount sufficient to create an elastic but fluid-tight joint between the coupling members and the respective pipe ends. It presently is contemplated to employ swelling agents capable of such action at temperatures of approximately 200° C. and above. It of course is necessary to employ a material which is sufficiently temperature resistant and stable at least to contemplated operating temperatures, and known such agents achieve this result at least up to 800° C. It of course is to be understood that the coupling members 7, 10 and the pipe ends are dimensionally stable under the pressures exerted by heating of the swelling agent within the ceramic fiber mat material.

Assembly of the connection according to the present invention is extremely simple. Thus, at a temperature below the contemplated temperature and minimum temperature at which the swelling agent undergoes volume expansion, the strips of fiber mat material 9 are inserted either into the coupling members 7, 10 and the respective pipe ends then are inserted into the fiber mat material, or the strips of fiber mat material may be applied over the pipe ends and then inserted into the respective coupling members.

When the pipes and the thus formed connection assemblies are subject for the first time to the specific elevated operating temperature, the volume of the strips of ceramic fiber mat material 9 increase such that they become braced within the spaces between the coupling members and the respective pipe ends under compression, thereby exerting pressure and forming a friction joint. As a result, the respective pipes are firmly connected and the joints 8, 11 are sealed in a fluid-tight manner.

Although the present invention has been described and illustrated with respect to preferred features thereof, it is to be understood that various modifications and changes may be made to the specifically described and illustrated features without departing from the scope of the present invention. It particularly is to be understood that the ceramic fiber mat material including the swelling agent may be of various known compositions as would be understood by one skilled in the art.

We claim:

1. In an assembly of two parts having confronting ends defining therebetween a joint and a connection joining said two parts, said assembly intended for operation at an operating temperature from approximately 200° C. to approximately 800° C., the improvement wherein said connection comprises:

a dimensionally stable coupling member surrounding said joint and at least one of said ends, said coupling member and said at least one said end defining therebetween a space; and ceramic fiber mat material positioned within said space and containing approximately 40-60 weight % of a swelling agent capable of volume expansion when subjected to said operating temperature, thereby forming means for, upon said assembly being subjected to said operating temperature, swelling said mat material and compressing said mat material between said coupling member and said at least one end, thereby connecting said two parts.

2. The improvement claimed in claim 1, wherein said coupling member is separate from both of said parts and surrounds both of said confronting ends thereof.

3. The improvement claimed in claim 1, wherein said coupling member is formed on one of said parts and surrounds said end of the other said part.

4. The improvement claimed in claim 3, wherein said coupling element comprises an integral extension of said end of said one part.

5. The improvement claimed in claim 1, wherein said parts are hollow for conveying therethrough a medium at said operating temperature.

6. The improvement claimed in claim 1, wherein said parts are hollow and rigid.

7. The improvement claimed in claim 6, wherein said parts are formed of ceramic material.

8. The improvement claimed in claim 1, wherein said coupling member is formed of ceramic material.

9. The improvement claimed in claim 1, wherein said two parts comprise hollow pipes.

10. The improvement claimed in claim 9, wherein one said pipe comprises a pipe bend.

11. The improvement claimed in claim 1, wherein said assembly is positioned within the interior of a recuperator casing.

12. The improvement claimed in claim 4, wherein said extension is of increased diameter.

13. The improvement claimed in claim 6, wherein the inside diameter of said coupling member is larger than the outside diameter of said hollow part of said at least one end by at least twice the wall thicknesses of said hollow parts.

14. A connection assembly for joining two parts having confronting ends with a joint therebetween, said assembly comprising:

dimensionally stable coupling means for surrounding the joint and at least one of the two confronting ends of the two parts to be joined, said coupling means being dimensioned to define a space with the at least one part end; and ceramic fiber mat material to be positioned within the space and containing approximately 40–60 weight % of a swelling agent capable of volume expansion when subjected to an operating temperature from approximately 200° C. to approximately 800° C., thereby forming means for, upon being subjected to said operating temperature, swelling said mat material, such that said mat material would be compressed between said coupling means and the at least one part end, thereby connecting the two parts.

15. An assembly as claimed in claim 14, wherein said coupling means is separate from both of the parts.

16. An assembly as claimed in claim 14, wherein said coupling means is formed on one of the parts.

17. An assembly as claimed in claim 16, wherein said coupling means comprises an integral extension of the end of one of the parts.

18. An assembly as claimed in claim 14, wherein said coupling means is formed of ceramic material.

19. An assembly as claimed in claim 14, wherein said coupling means comprises a cylindrical member.

20. An assembly as claimed in claim 17, wherein said extension is of increased diameter.

* * * * *